US012366298B2

(12) United States Patent
Dixon et al.

(10) Patent No.: US 12,366,298 B2
(45) Date of Patent: Jul. 22, 2025

(54) PORT CONNECTING ASSEMBLIES AND ARRANGEMENTS

(71) Applicant: Swagelok Company, Solon, OH (US)

(72) Inventors: Matthew Dixon, Parma, OH (US); Joseph Sagal, Solon, OH (US)

(73) Assignee: SWAGELOK COMPANY, Solon, OH (US)

( * ) Notice: Subject to any disclaimer, the term of this patent is extended or adjusted under 35 U.S.C. 154(b) by 644 days.

(21) Appl. No.: 17/483,907

(22) Filed: Sep. 24, 2021

(65) Prior Publication Data

US 2022/0099199 A1 Mar. 31, 2022

Related U.S. Application Data

(60) Provisional application No. 63/085,238, filed on Sep. 30, 2020.

(51) Int. Cl.
*G01N 1/20* (2006.01)
*F16K 11/044* (2006.01)
*F16K 11/22* (2006.01)

(52) U.S. Cl.
CPC ............ *F16K 11/22* (2013.01); *F16K 11/044* (2013.01); *G01N 1/2035* (2013.01); *G01N 2001/205* (2013.01); *G01N 2001/2071* (2013.01)

(58) Field of Classification Search
CPC ... F16L 19/061; F16L 19/103; F16L 27/0808; F16L 27/0849; F16L 39/00;
(Continued)

(56) References Cited

U.S. PATENT DOCUMENTS 5,746,454 A 5/1998 Webb
2016/0273687 A1* 9/2016 Rubinski .................. G01L 5/24

FOREIGN PATENT DOCUMENTS

CN 102996957 A * 3/2013
CN 102996957 B 6/2015
(Continued)

OTHER PUBLICATIONS

Mechatest Sampling Solutions, Bottle Sampling Systems borchure, 4 pgs., believed to be published before Sep. 30, 2020.
(Continued)

*Primary Examiner* — John Fitzgerald
*Assistant Examiner* — Truong D Phan
(74) *Attorney, Agent, or Firm* — Calfee, Halter & Griswold LLP

(57) ABSTRACT

A multiple port connecting assembly includes a connector body and a fluid isolation adapter. The connector body includes a first fluid passage extending from an adapter port to a first connector port, a second fluid passage extending from the adapter port to a second connector port, a first seat portion disposed between the first fluid passage and the second fluid passage, and a second seat portion disposed between the second fluid passage and an open end portion of the adapter port. The fluid isolation adapter is removably assembled with the adapter port and includes an adapter body defining a first end passage that connects with the first fluid passage, a second end passage that connects with the second fluid passage, a first seal portion sealing against the first seat portion, and a second seal portion sealing against the second seat portion.

13 Claims, 7 Drawing Sheets

(58) Field of Classification Search
CPC ...... F16L 39/005; F16L 39/04; G01N 1/2035; G01N 2001/205; G01N 2001/2071; G01N 2001/2085; G01N 2001/2285; G01N 1/00; G01N 1/08; G01N 2001/028; G01N 2001/1031; G01N 1/2226; G01N 1/2247; F16K 11/22; F16K 11/044
See application file for complete search history.

(56) References Cited

FOREIGN PATENT DOCUMENTS

| | | | | |
|---|---|---|---|---|
| DE | 1794409 B | * | 5/1977 | ............. B01J 8/002 |
| EP | 319072 A1 | | 6/1989 | |
| FR | 1276007 A | | 11/1961 | |
| GB | 1268791 A | | 3/1972 | |
| KR | 20140079471 A | * | 6/2014 | |
| WO | WO-2010056439 A2 | * | 5/2010 | ............. E21B 17/04 |

OTHER PUBLICATIONS

Swagelok Company, Installation Instructions for Swagelok Port Connectors, copyright 2001-2010, 2 pgs.
International Search Report and Written Opinion from PCT/US2021/051858 dated Dec. 23, 2021.
Office action European Application No. 21795091.4 dated Sep. 9, 2024.

* cited by examiner

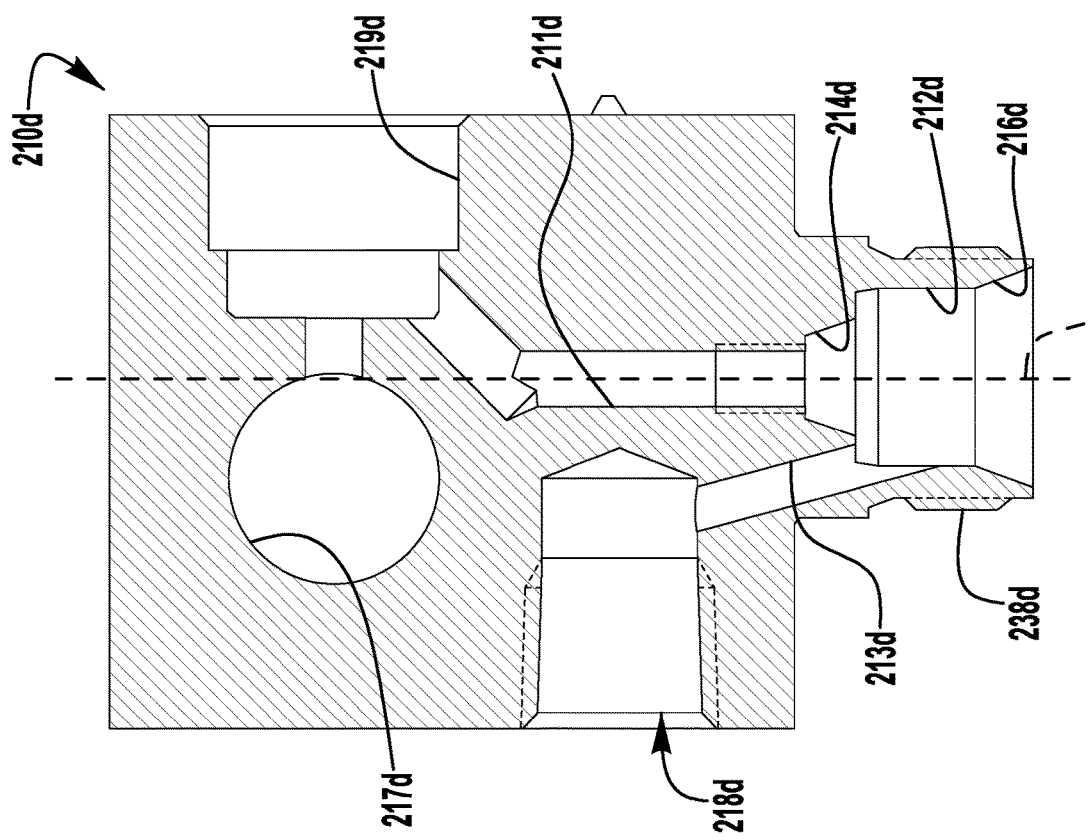
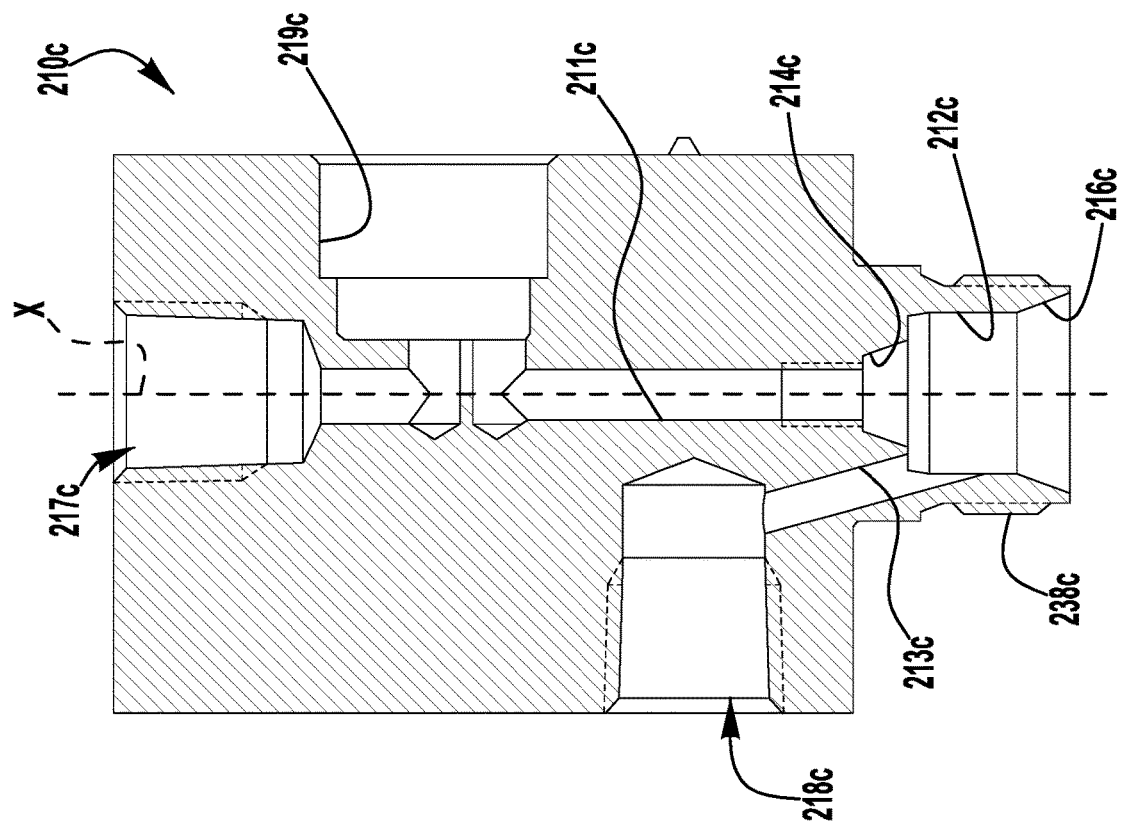

PORT CONNECTING ASSEMBLIES AND ARRANGEMENTS

CROSS-REFERENCE TO RELATED APPLICATION

This application claims priority to and all benefit of U.S. Provisional Patent Application Ser. No. 63/085,238, filed on Sep. 30, 2020, for FLUID SAMPLING SYSTEM, the entire disclosure of which is fully incorporated herein by reference.

TECHNICAL FIELD

The present disclosure relates to port connecting assemblies. More particularly, the disclosure relates to port connecting assemblies for use in fluid sampling systems.

BACKGROUND

In the operation of many chemical and other processes it is often necessary to periodically sample fluids which are flowing within the process at various points. Many process fluids present serious safety hazards when released or exposed to the atmosphere. Other process fluids, although not extremely hazardous or toxic, may be highly water sensitive for absorption of atmosphere moisture which makes it impossible to obtain an accurate moisture analysis if the sample is exposed to the atmosphere. For a multitude of reasons, it may be desirable to obtain various process fluid samples in a manner which does not permit exposure of the sample fluid to the atmosphere.

SUMMARY OF THE DISCLOSURE

In accordance with an exemplary aspect of one or more of the inventions presented in this disclosure, a multiple port connecting assembly includes a connector body and a fluid isolation adapter. The connector body includes a first fluid passage extending from an adapter port to a first connector port, a second fluid passage extending from the adapter port to a second connector port, a first seat portion disposed between the first fluid passage and the second fluid passage, and a second seat portion disposed between the second fluid passage and an open end portion of the adapter port. The fluid isolation adapter is removably assembled with the adapter port and includes an adapter body defining a first end passage that connects with the first fluid passage, a second end passage that connects with the second fluid passage, a first seal portion sealing against the first seat portion and a second seal portion sealing against the second seat portion.

In accordance with another exemplary aspect of one or more of the inventions presented in this disclosure, a system for collecting a liquid sample includes a fluid source, a connector body, a fluid isolation adapter, and a sample container. The connector body includes a sample fluid passage extending from an adapter port to a sample fluid connector port connected with the fluid source, a second fluid passage extending from the adapter port to a second connector port, a first seat portion disposed between the sample fluid passage and the second fluid passage, and a second seat portion disposed between the second fluid passage and an open end portion of the adapter port. The fluid isolation adapter is removably assembled with the adapter port and includes an adapter body defining a sample fluid end passage that connects with the sample fluid passage at a first connection in the adapter port, a second end passage that connects with the second fluid passage at a second connection in the adapter port, a first seal portion sealing against the first seat portion to isolate the first connection from the second connection, and a second seal portion sealing against the second seat portion to seal the second connection against external leakage. A sample tube extending from a distal end portion of the sample fluid end passage extends into the sample container to supply sample fluid from the fluid source to the sample container.

BRIEF DESCRIPTION OF THE DRAWINGS

FIG. 5C is a cross-sectional view of another connector body for a sampling arrangement, in accordance with another exemplary embodiment of the present disclosure; and FIG. 5D is a cross-sectional view of another connector body for a sampling arrangement, in accordance with another exemplary embodiment of the present disclosure.

DESCRIPTION OF THE EXEMPLARY EMBODIMENTS

Figure 1:
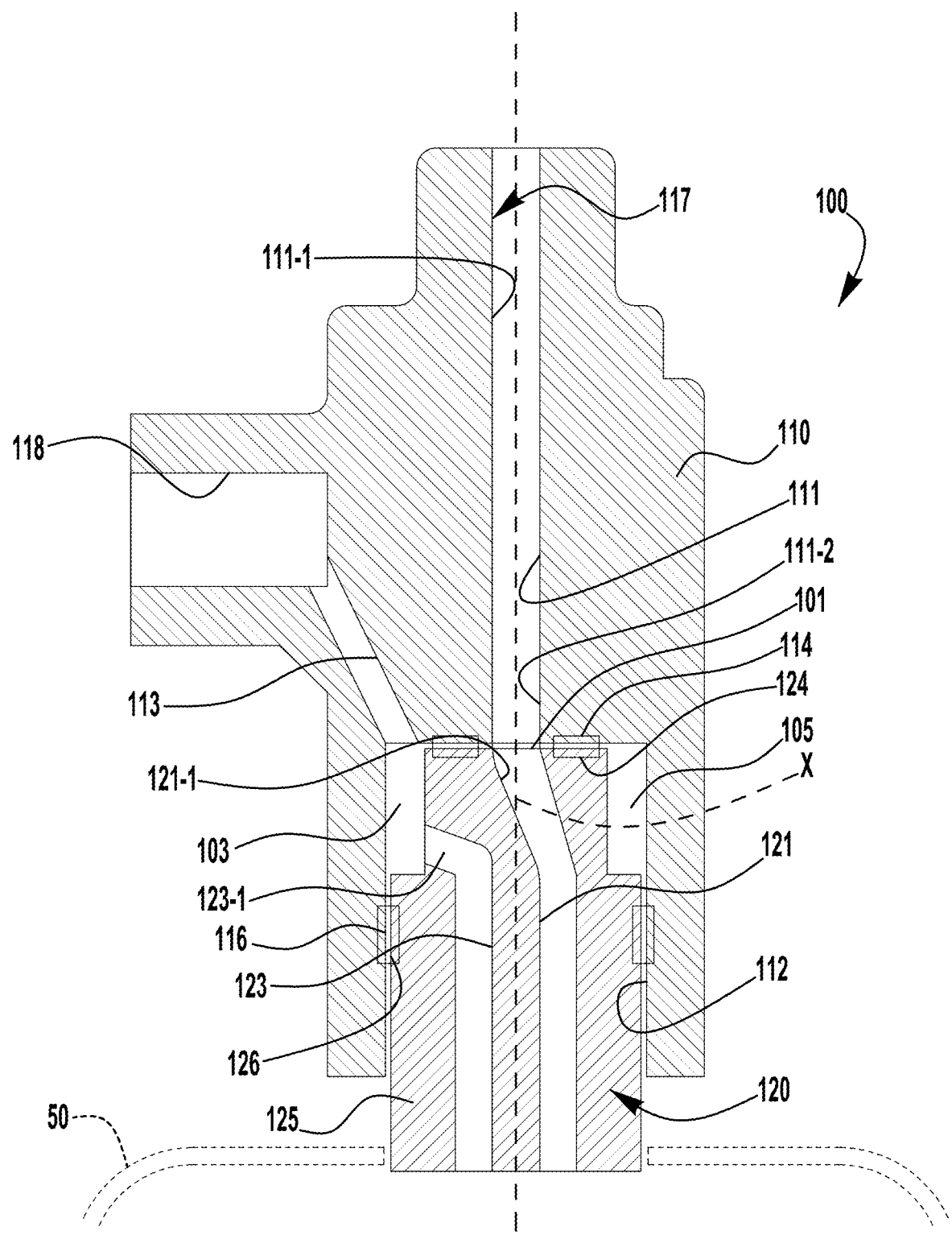
FIG. 1 is a cross-sectional schematic view of a sampling arrangement for a sample container, in accordance with an exemplary embodiment of the present disclosure.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to arrangements for collects liquid samples from fluid containers, the features of the present disclosure may additionally or alternatively be applied to other types of fluid systems and connection arrangements.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In many sampling applications, liquid samples are taken from a process pipeline into glass or plastic bottles, a practice often referred to as grab sampling. To dispense a sample into the bottle, one or more of tubes or needles are inserted through a cap portion of the bottle (e.g., through existing openings or piercing an elastomeric septum of the cap portion)—a fill tube/needle, thru which the sample flows into the bottle, and a vent tube/needle, through which the gas originally in the bottle can escape as that gas is displaced by the incoming liquid sample. These tubes/needles, when connected to a valve and a vent port respectively, provide a safe and controlled means of dispensing a sample into a bottle and venting potentially dangerous process gasses away from the operator.

The tubes/needles of a sampling arrangement are often welded or brazed to a valve/sampling assembly to eliminate the need for an elastomeric seal to avoid temperature limits/chemical compatibility issues related to use of such seals. When a tube/needle of a welded or brazed sampling assembly is damaged, or when a different porting configuration is desired, the entire welded/brazed assembly (e.g., valve and sampling tubes/needles) may need to be replaced.

According to an exemplary aspect of the present disclosure, a sampling arrangement may include a connector body and a fluid isolation adapter that is removably assembled to an adapter port of the connector body, for example, to allow for replacement of one or more end passage tubes disposed on the adapter (e.g., due to damage to the tube(s)) without having to replace the entire sampling arrangement.

The connector body defines a first fluid passage (e.g., sample fluid passage) and a second fluid passage (e.g., vent gas passage) each intersecting with an adapter port in the connector body, with the multiple port adapter being configured to be installed in the adapter port. The connector body includes a first seat portion disposed between the first fluid passage and the second fluid passage, and a second seat portion disposed between the second fluid passage and an open end portion of the adapter port. The multiple port adapter is configured to be assembled with (e.g., threaded or clamping engagement) the adapter port of the connector body, with a first seal portion of the multiple port adapter sealing against the first seat portion of the connector body, and a second seal portion of the multiple port adapter sealing against the second seat portion of the connector body.

FIG. 1 schematically illustrates an exemplary sampling arrangement 100 for a sample container 50, including a connector body 110 and a fluid isolation or multiple passage adapter 120 assembled with an adapter port 112 of the connector body. The fluid isolation adapter 120 has an adapter body 125 defining a first end passage 121 that connects with a first fluid passage 111 (e.g., sample fluid passage) of the connector body 110 at a first connection 101 and a second end passage 123 that connects with a second fluid passage 113 (e.g., vent gas passage) of the connector body at a second connection 103. A first seal portion 124 of the fluid isolation adapter 120 seals against a seat portion 114 of the connector body 110 to isolate the first connection 101 from the second connection 103. A second seal portion 126 of the fluid isolation adapter 120 seals against an outer portion or second seat portion 116 of the adapter port 112 to seal the second connection 103 against external leakage.

The first and second passages of the sampling arrangement may be provided in a variety of configurations. In an exemplary embodiment, the first fluid passage 111 extends from a proximal end of the adapter port 112 to a first end connection or connector port 117 of the connector body 110, with the annular seat portion 114 surrounding the first fluid passage, and with a distal end portion 111-2 aligning with a central axis X of the connector body. At least a proximal end portion 121-1 of the first end passage 121 of the fluid isolation adapter 120 aligns with the central axis X of the connector body 110 to provide the first connection 101, and the first seal portion 124 surrounds the proximal end portion 121-1 to seal against the seat portion 114, thereby isolating the first connection 101. The second fluid passage 113 extends laterally from the adapter port 112, distal to the seat portion 114, to a second end connection or connector port 118 of the connector body 110. At least a proximal end portion 123-1 of the second end passage 123 of the fluid isolation adapter 120 extends to an outer radial portion of the adapter body 125 in fluid communication with the second fluid passage 113 to provide the second connection 103, and the second seal portion 126 surrounds the fluid isolation adapter 120 distal to the proximal end portion 123-1 of the second end passage 123 to seal the second connection 103 against external leakage.

In some embodiments, the second end passage of the fluid isolation adapter may be circumferentially aligned with the second fluid passage of the connector body to provide the second connection. In other exemplary embodiments of the present disclosure, the connector body 110 and adapter body 125 together define an annular cavity 105 within the adapter port 112, between the first and second seal portions 124, 126 of the fluid isolation adapter, with the annular cavity providing the second connection 103 between the second fluid passage 113 of the connector body and the second end passage 123 of the fluid isolation adapter, regardless of the rotational orientation of the fluid isolation adapter within the adapter port.

Many different types of sealing arrangements may be utilized to isolate the first and second fluid passages within the adapter port. In an exemplary embodiment, the fluid isolation adapter is provided with a conical nose portion that is axially advanced into seating engagement with a tapered annular seat portion of the connector body to provide a metal-to-metal seal. As one example, the fluid isolation adapter may include a conical nose portion geometrically similar to the machined ferrule end of a port connector used with a tube fitting (e.g., a ¼" Swagelok port connector), and the connector body may include a tapered annular seat portion geometrically similar to the camming mouth of a ferrule-based tube fitting (e.g., a ¼" Swagelok two-ferrule tube fitting).

Many different types of attachment arrangements may be used to secure the fluid isolation adapter in the adapter port with the adapter seal portion in sealing engagement with the connector body seat portion. In an exemplary embodiment, a threaded nut may be installed over the fluid isolation adapter and assembled with a threaded end portion of the body connector adapter port to secure (e.g., clamp or grip) the fluid isolation adapter in the adapter port and to advance the adapter seal portion in sealing engagement with the connector body seat portion. As one example, the assembly may include a female threaded fitting nut (e.g., a female threaded fitting nut for a ½" Swagelok two-ferrule tube fitting) installed over the fluid isolation adapter and threaded onto a male threaded end (e.g., a male threaded connector for a ½" Swagelok two-ferrule tube fitting) of the adapter port.

Many different types of sealing arrangements may be utilized to seal the fluid isolation adapter with the outer portion of the adapter port to seal the second fluid passage against external leakage. In an exemplary embodiment, one or more ferrules are installed between an outer cylindrical surface (defining the second seal portion) of the fluid isolation adapter and a tapered annular mouth portion of the adapter port to provide sealing engagement between adapter port and the outer cylindrical surface. As one example, the fluid isolation adapter may include a ½" nominal outer diameter cylindrical surface defining the second seal portion, the body connector adapter port may include a tapered annular mouth portion geometrically similar to the camming mouth of a ferrule-based tube fitting (e.g., a ½" Swagelok two-ferrule tube fitting), with ferrules (e.g., ½" Swagelok front and rear ferrule set) disposed between the annular mouth portion and the cylindrical surface. As described above, a female threaded fitting nut pulled up on the male threaded end of the adapter port, clamps or swages the ferrules against the cylindrical surface of the fluid isolation adapter to provide a seal (e.g., metal-to-metal seal) between the adapter port and the cylindrical surface, and to grip the fluid isolation adapter in an installed condition within the adapter port.

Figure 2:
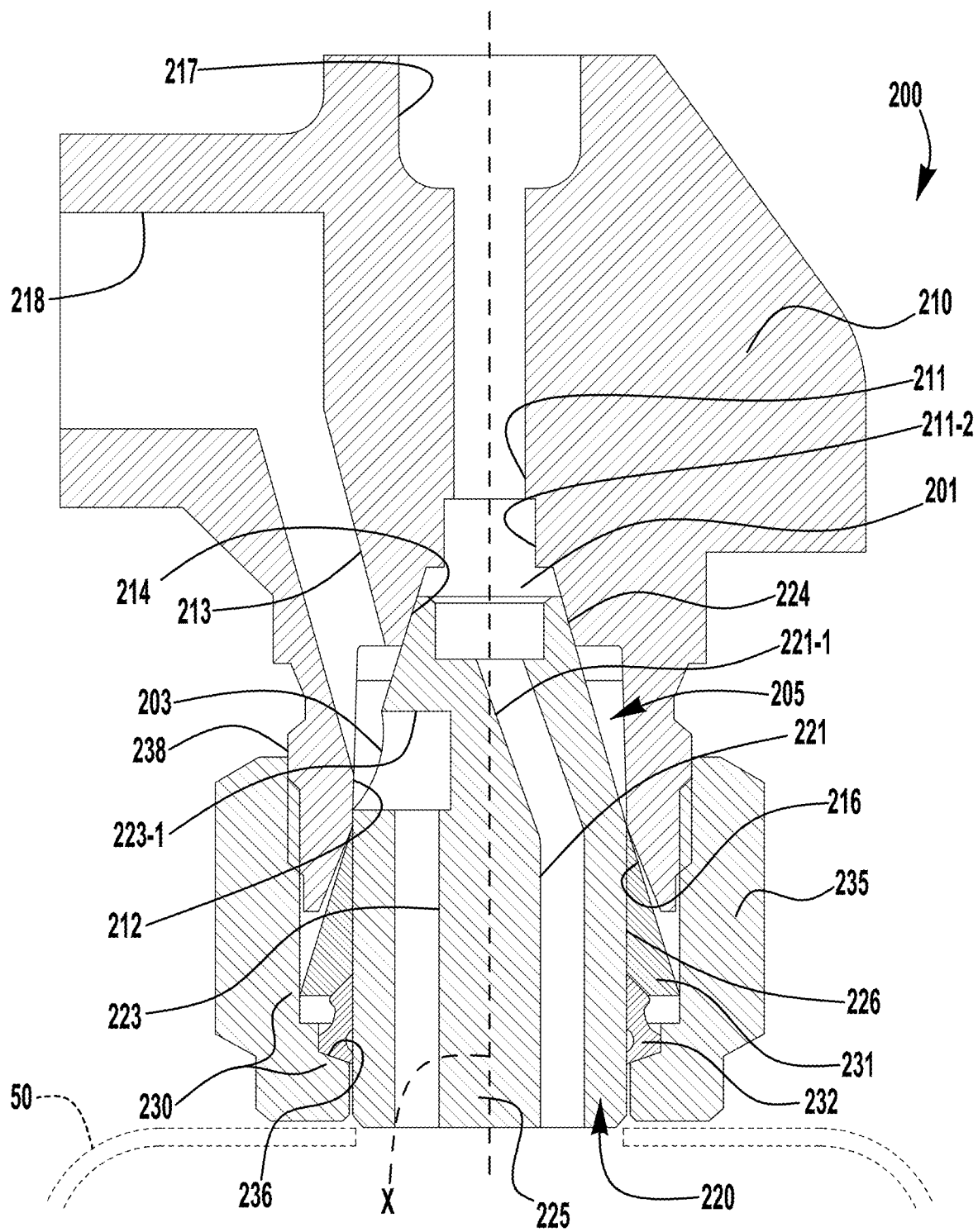
FIG. 2 is a cross-sectional view of a sampling arrangement for a sample container, in accordance with another exemplary embodiment of the present disclosure.

FIG. 2 illustrates an exemplary sampling arrangement 200 for a sample container 50, including a connector body 210 and a fluid isolation adapter 220 assembled with an adapter port 212 of the connector body. The fluid isolation adapter 220 has an adapter body 225 defining a first end passage 221 that connects with a first fluid passage 211 (e.g., sample fluid passage) of the connector body 210 at a first connection 201 and a second end passage 223 that connects with a second fluid passage 213 (e.g., vent gas passage) of the connector body at a second connection 203. The adapter port 212 is provided with a male threaded fitting connector 238, and a female threaded fitting nut 235 is assembled with the male threaded fitting connector to secure the fluid isolation adapter 220 in sealing engagement within the adapter port. A first seal portion or conical nose portion 224 of the adapter body 225 seals against a tapered annular first seat portion 214 of the connector body 210 to isolate the first connection 201 from the second connection 203. A ferrule arrangement 230 (e.g., front and rear ferrules 231, 232) is clamped or swaged into gripping and sealing engagement between a second seal portion or cylindrical outer surface 226 of the adapter body 225 and an outer mouth portion or second seat portion 216 of the adapter port 212, by driving engagement of a counterbore portion 236 of the fitting nut 235 with the ferrule set 230 when the fitting nut is pulled up on the male threaded fitting connector 238.

Figure 3:
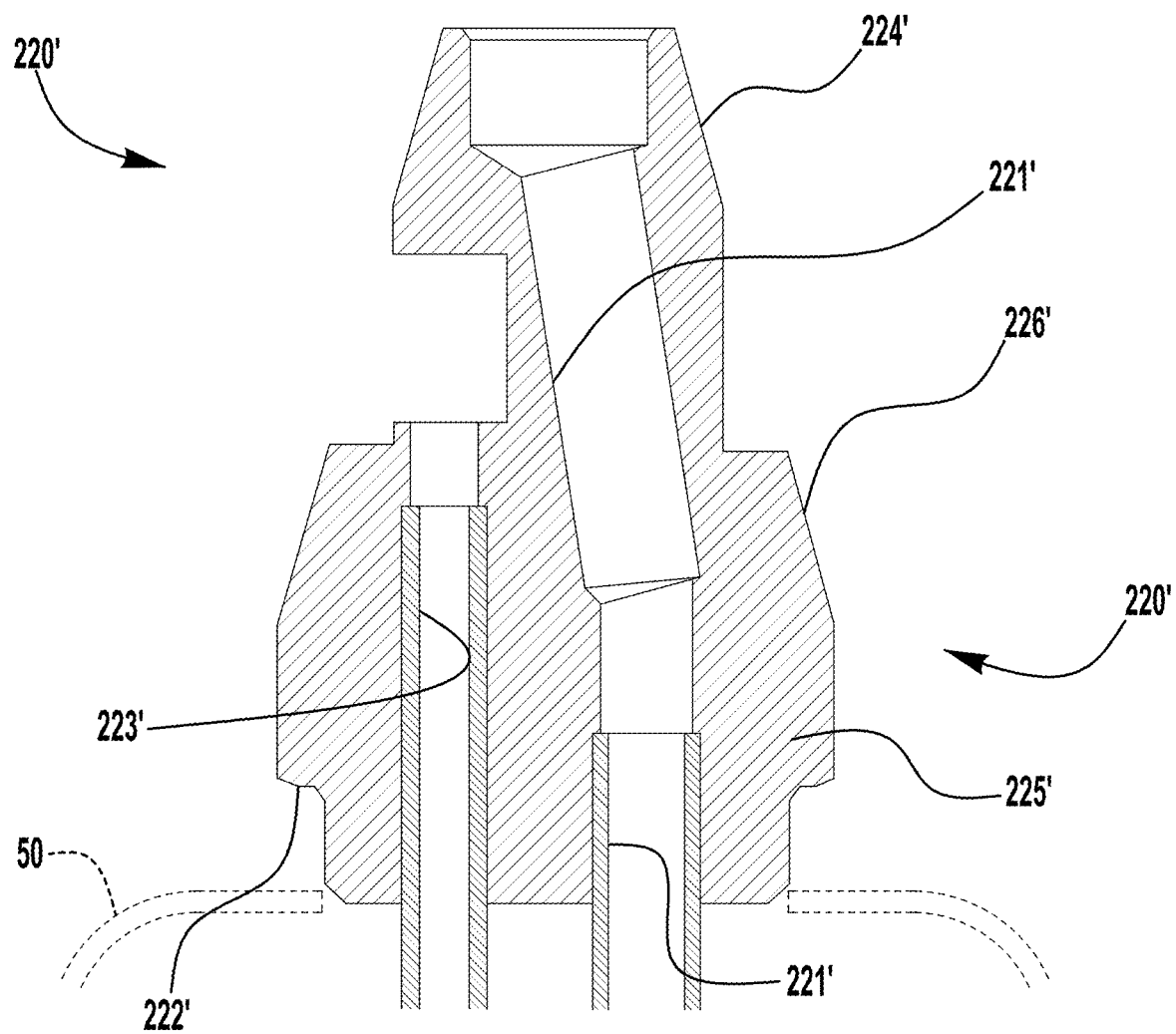
FIG. 3 is a cross-sectional view of a sampling adapter for a sampling arrangement, in accordance with another exemplary embodiment of the present disclosure.

In another embodiment, as shown in FIG. 3, instead of an outer cylindrical surface gripped and sealed against by a ferrule arrangement, a fluid isolation adapter 220' includes an adapter body 225' having a tapered frustoconical second seal portion 226' configured to seal directly against a tapered outer mouth portion of a connector body adapter port (as shown in FIG. 2), thereby eliminated the use of a ferrule arrangement. The tapered frustoconical shape of the second seal portion 226' may, for example, be similar in geometry to the front nose of a ½" Swagelok Port Connector. The exemplary adapter body 225' includes a shoulder portion 222', distal to the second seal portion 226', that is driven by the fitting nut counterbore 236 when the fitting nut 235 is pulled up on the male threaded fitting connector 238 (see FIG. 2) to drive the second seal portion 226' into sealing engagement with the outer mouth portion 216 of the adapter port 212.

Referring back to FIG. 2, the first fluid passage 211 extends from a proximal end of the adapter port 212 to a first end connection or connector port 217 of the connector body 210, with the tapered annular seat portion 214 surrounding the first fluid passage, and with a distal end portion 211-2 aligning with a central axis X of the connector body. At least a proximal end portion 221-1 of the first end passage 221 of the fluid isolation adapter 220 aligns with the central axis X of the connector body 210 to provide the first connection 201, and the nose portion 224 surrounds the proximal end portion 221-1 to seal against the tapered seat portion 214, thereby isolating the first connection 201. The second fluid passage 213 extends laterally from the adapter port 212, distal to the tapered seat portion 214, to a second end connection or connector port 218 of the connector body 210.

The connector body 210 and adapter body 225 together define an annular cavity 205 within the adapter port 212, between the first seal portion or nose portion 224 and the second seal portion or cylindrical outer surface 226 of the adapter body 225 and connected with the second fluid passage 213. At least a proximal end portion 223-1 of the second end passage 223 of the fluid isolation adapter 220 extends to an outer radial portion of the adapter body 225, between the first and second seal portions 224, 226 and in alignment with the annular cavity 205 to provide the second connection 203, regardless of the rotational orientation of the fluid isolation adapter within the adapter port.

A fluid isolation adapter, as described herein, may include a variety of different passage configurations, including, for example, machined fluid passages, machined tube stubs, welded or brazed tubes/needles, and/or machined or welded/ brazed end connections to provide end passages extending from the sampling arrangement connections with the connector body and an end port.

Figure 4A:
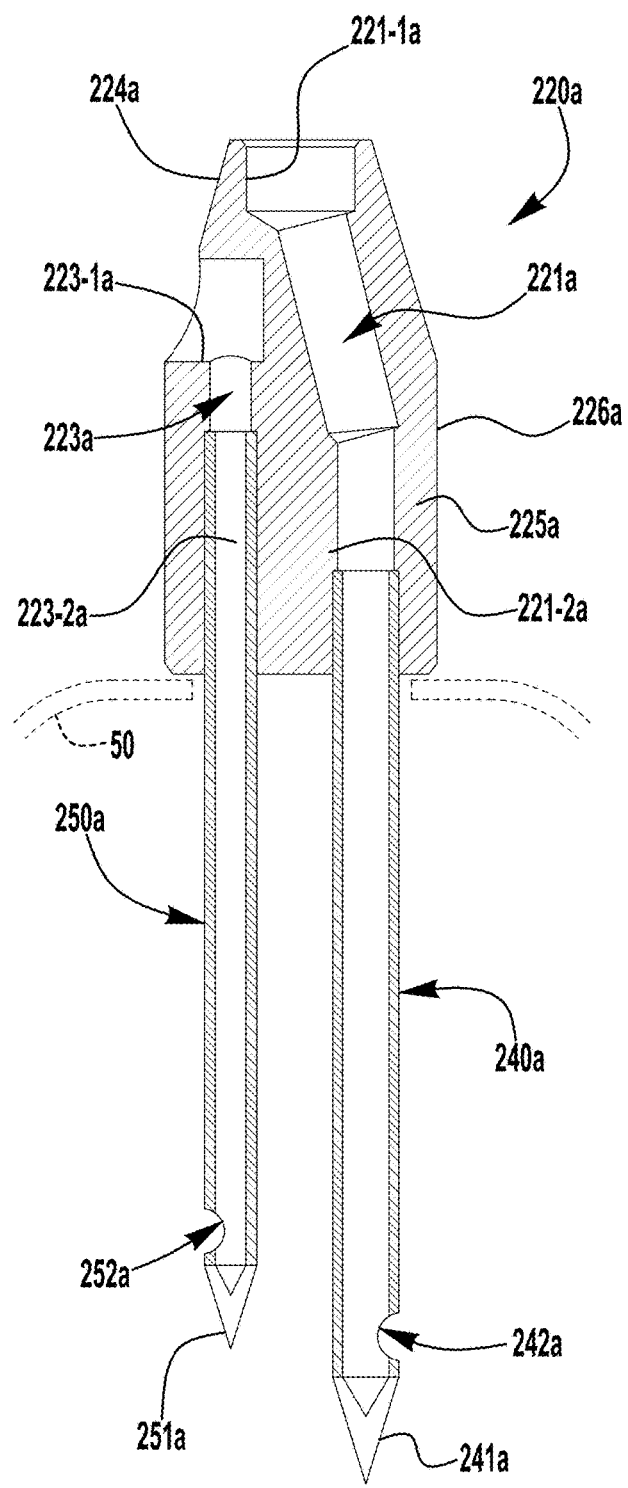
FIG. 4A is a cross-sectional view of a sampling adapter for a sampling arrangement, in accordance with another exemplary embodiment of the present disclosure.

FIG. 4A illustrates an exemplary embodiment of a fluid isolation adapter 220a including an adapter body 225a (similar to the adapter body 225 of FIG. 2, and numbered accordingly) defining a first end passage (e.g., sample passage) 221a having a central proximal end portion 221-1a connected to a radially offset axially extending distal end portion 221-2a, and a second end passage (e.g., vent passage) 223a having a laterally extending proximal end portion 223-1a connected to a radially offset (i.e., from the central axis X) axially extending distal end portion 223-2a. A first tube (e.g., sample tube) 240a extends from (e.g., is welded or brazed to) the adapter body 225 at the distal end portion 221-2a of the first end passage 221a and may include a sharp needle end 241a, for example, for puncturing or otherwise penetrating a septum of a sample bottle (not shown), and an end aperture 242a, for example, for supplying sample fluid into a sample bottle. A second tube (e.g., vent tube) 250a extends from (e.g., is welded or brazed to) the adapter body 225a at the distal end portion 223-2a of the second end passage 223a and may include a sharp needle end 251a, for example, for puncturing or otherwise penetrating a septum (not shown) of a sample bottle or sample container 50, and an end aperture 252a, for example, for receiving vented gas from the sample bottle.

Figure 4B:
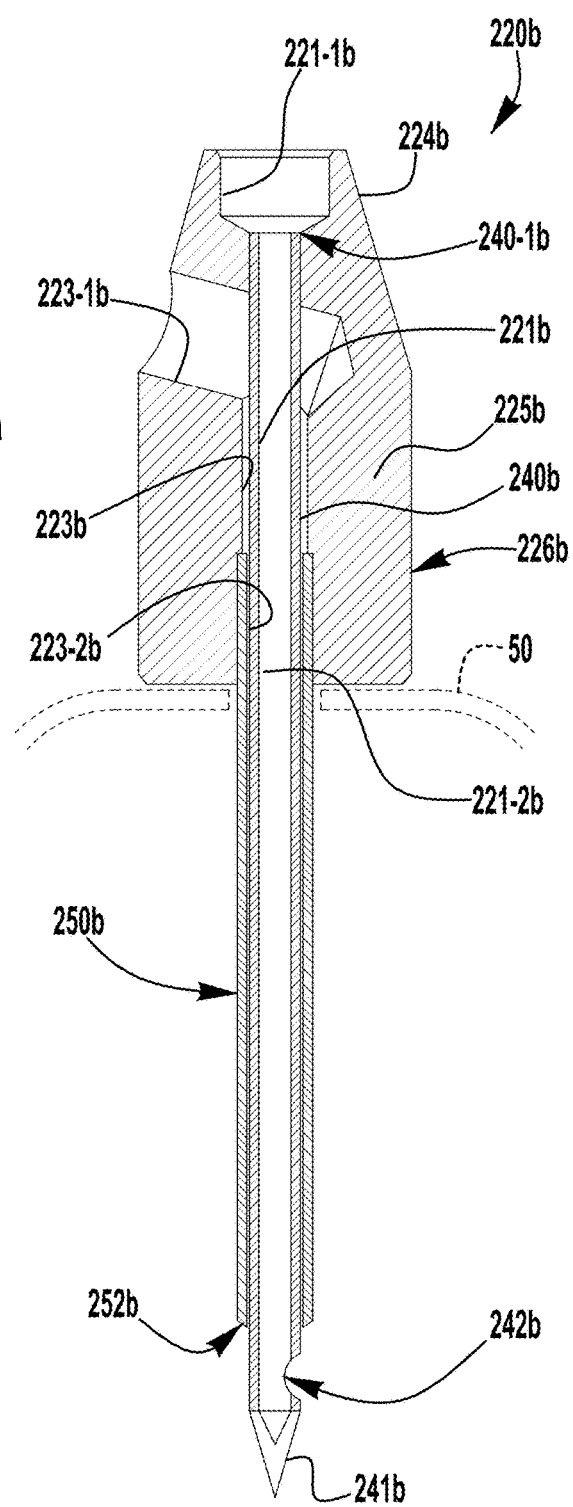
FIG. 4B is a cross-sectional view of another sampling adapter for a sampling arrangement, in accordance with another exemplary embodiment of the present disclosure.

FIG. 4B illustrates another exemplary embodiment of a fluid isolation adapter 220b including an adapter body 225b (similar to the adapter body 225 of FIG. 2, and numbered accordingly) defining a first end passage (e.g., sample passage) 221b having a central proximal end portion 221-1b extending axially to a central distal end portion 221-2b, and a second end passage (e.g., vent passage) 223b having a laterally extending proximal end portion 223-1b connected to central axially extending distal end portion 223-2b, surrounding and concentric with the distal end portion 223-1b of the first end passage 221b. To define the distal end portion 221-2b of the first end passage 221b, a proximal end 240-1b of a first tube (e.g., sample tube) 240b extends from (e.g., is welded or brazed to) the adapter body 225b at the proximal end portion 221-1b of the first end passage 221b and extends through the distal end portion 223-2b of the second end passage 223b. The sample tube 240b may include a sharp needle end 241b, for example, for puncturing or otherwise penetrating a septum (not shown) of a sample bottle or sample container 50, and an end aperture 242b, for example, for supplying sample fluid into a sample bottle. A second tube (e.g., vent tube) 250b extends from (e.g., is welded or brazed to) the adapter body 225b at the distal end portion 223-2b of the second end passage 223b and may terminate at an end aperture 252b proximal to the end aperture 242b of the sample tube 240b, for example, for receiving vented gas from the sample bottle through the annular space between the sample tube 240b and the vent tube 250b. In such an arrangement, the centrally aligned sample tube 240b and vent tube 250b may be less susceptible to damage from inadvertent or intentional rotation of the fluid isolation adapter 220b within the access port.

Figure 4C:
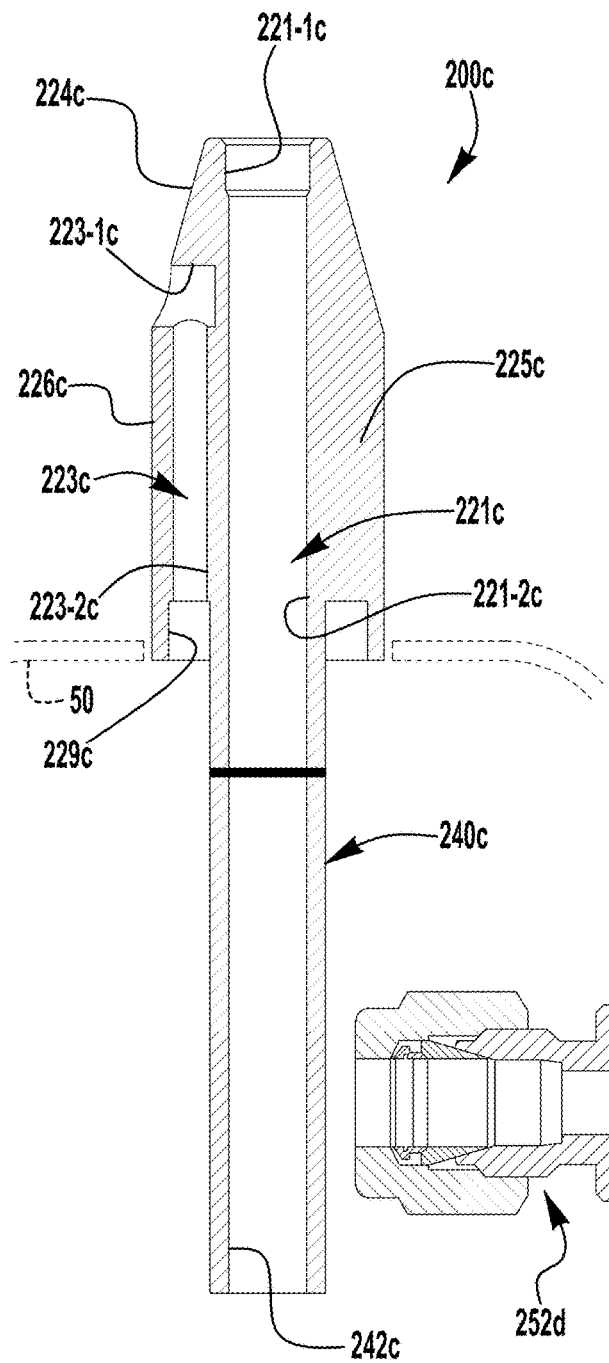
FIG. 4C is a cross-sectional view of another sampling adapter for a sampling arrangement, in accordance with another exemplary embodiment of the present disclosure.

FIG. 4C illustrates another exemplary embodiment of a fluid isolation adapter 220c including an adapter body 225c (similar to the adapter body 225 of FIG. 2, and numbered accordingly) defining a first end passage (e.g., sample passage) 221c having a central proximal end portion 221-1c extending axially to a central distal end portion 221-2c, and one or more second end passages (e.g., vent passages) 223c having a laterally extending proximal end portion 223-1c connected to a radially offset (i.e., from the central axis X) axially extending distal end portion 223-2c. A tube (e.g., sample tube) 240c extends from the adapter body 225c (e.g., welded or brazed to a machined tube stub at the distal end of the body) at the distal end portion 221-2c of the first end passage 221c and may include an end aperture 242c, for example, for supplying sample fluid into a sample bottle or sample container 50. The distal end portion 223-2c of the second end passage 223c extends to an end aperture 229c on the adapter body 225c, for example, for receiving vented gas from the sample bottle. In an exemplary embodiment, the second connector port or vent port 218 of the connector body 210 may be attached to a vacuum system (not shown) such that fumes from the process fluid could be drawn away from the assembly operator. Such an arrangement may be secured to an open end of a sample bottle, rather than penetrating a sample bottle septum (like the embodiments of FIGS. 3A and 3B). In one such embodiment, the adapter body may define multiple vent passages arranged circumferentially or circumferentially offset from each other around the central sample passage.

Figure 4D:
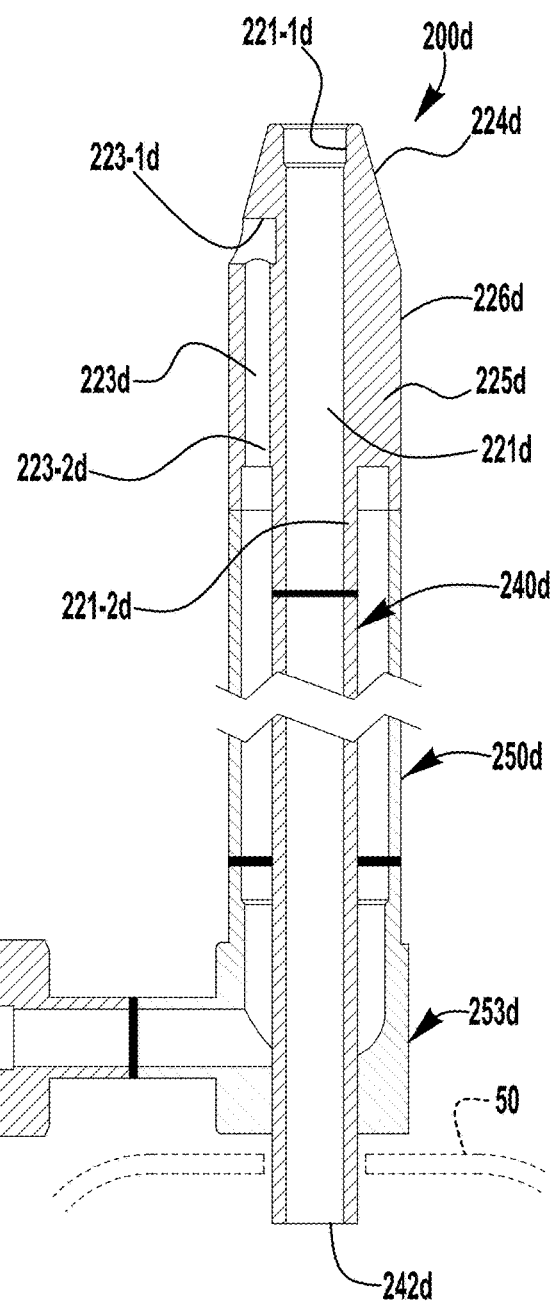
FIG. 4D is a cross-sectional view of another sampling adapter for a sampling arrangement, in accordance with another exemplary embodiment of the present disclosure.

FIG. 4D illustrates another exemplary embodiment of a fluid isolation adapter 220d including an adapter body 225d (similar to the adapter body 225 of FIG. 2, and numbered accordingly) defining a first end passage (e.g., sample passage) 221d having a central proximal end portion 221-1d extending axially to a central distal end portion 221-2d, and one or more second end passages (e.g., conditioning passages) 223d having a laterally extending proximal end portion 223-1d connected to an axially extending distal end portion 223-2d, offset from the first end passage 221d. A first tube (e.g., sample tube) 240d extends from the adapter body 225d (e.g., welded or brazed to a machined tube stub at the distal end of the body) at the distal end portion 221-2d of the first end passage 221d and may include an end aperture 242d, for example, for supplying sample fluid into a sample bottle or sample container 50. A second tube (e.g., conditioning tube) 250d extends from (e.g., is welded or brazed to) the adapter body 225b to surround the first tube 240d and the distal end portion(s) 223-2d of the second end passage(s) 223d and may terminate at bent or elbowed end connector 252d through which the first tube 240d extends (e.g., extending through and welded or brazed to a bore in the elbow portion 253d). Such an arrangement may be used to flow steam or other conditioning fluid through an annulus between the first and second tubes 240d, 250d, for example, to maintain a desired viscosity of the sample fluid within the sample tube. The end connector 252d may be connected to a fluid line for recirculation or disposal of a conditioning fluid. The sampling arrangement may be used with an open ended sample container (for which venting is not needed), or in combination with a separate venting arrangement.

A connector body, as described herein, may include a variety of porting configurations, including, for example, valve ports, passthrough ports, and end connector ports. In some embodiments, a connector body includes a first fluid passage extending to a sample fluid receiving port (e.g., end connector port, valve port, and/or passthrough port), and a second fluid passage extending to a diverting port (e.g., end connector port and/or valve port), such as a vent port.

Figure 5B:
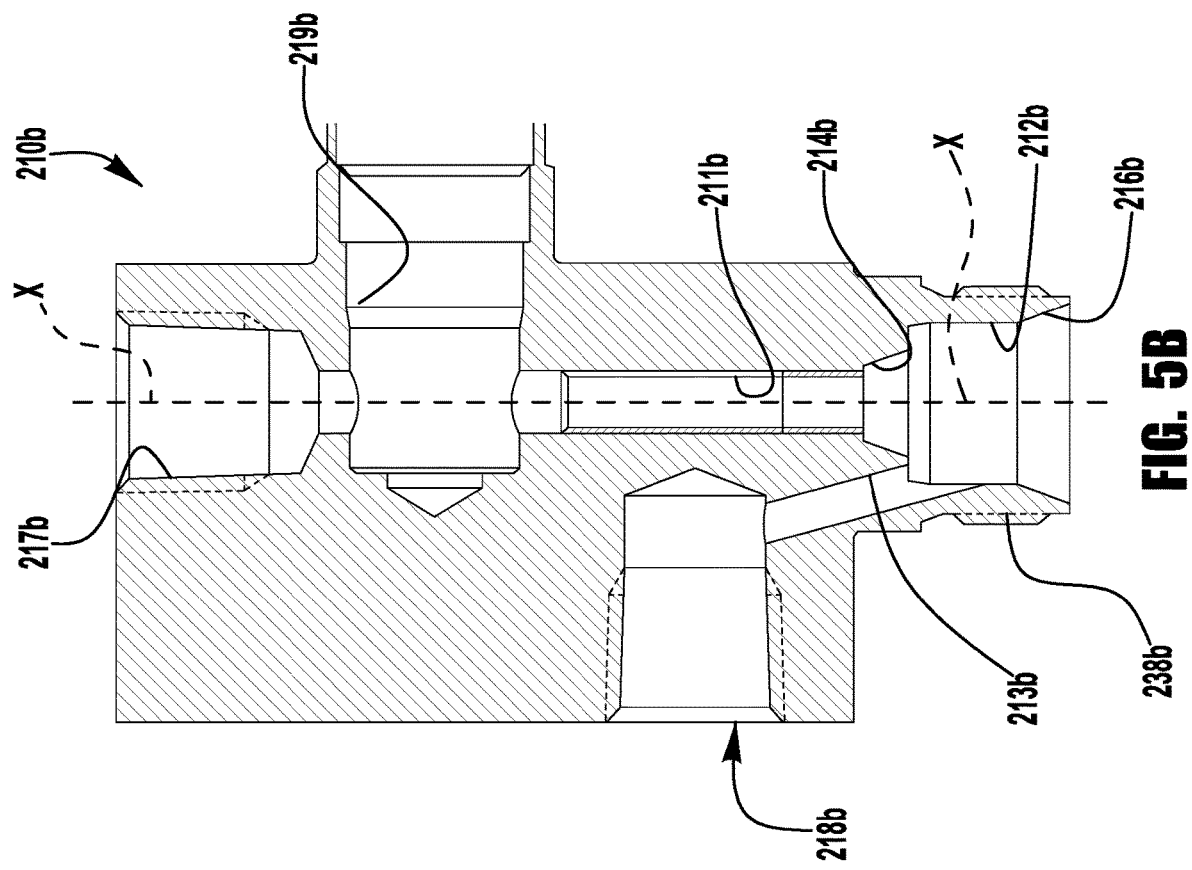
FIG. 5B is a cross-sectional view of another connector body for a sampling arrangement, in accordance with another exemplary embodiment of the present disclosure.
Figure 5A:
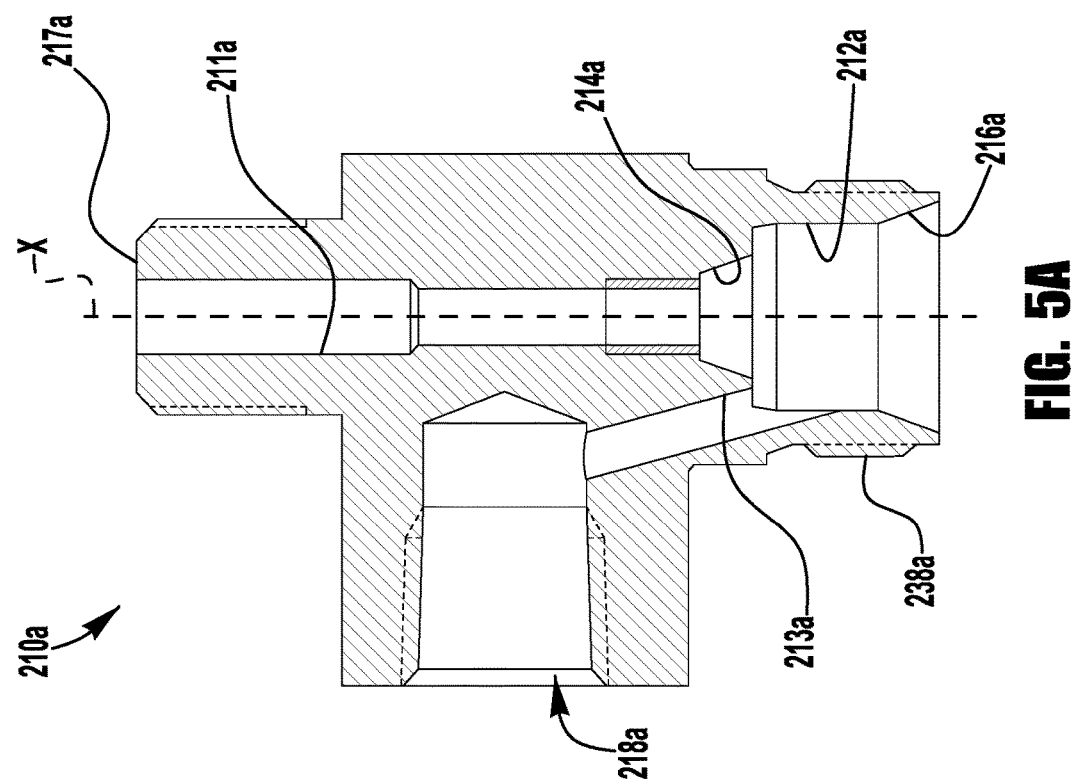
FIG. 5A is a cross-sectional view of a connector body for a sampling arrangement, in accordance with another exemplary embodiment of the present disclosure.

FIG. 5A illustrates an exemplary embodiment of a connector body 210a including a first fluid passage (e.g., sample fluid passage) 211a extending along a central axis X of the connector body from an adapter port 212a to a first connector port 217a (e.g., a male threaded connector, as shown) and a second fluid passage (e.g., vent gas or conditioning passage) 213a extending laterally from the adapter port 212a to a second connector port 218a (e.g., a female threaded connector, as shown). Similar to the embodiment of FIG. 2, the connector body 210a includes a tapered annular first seat portion 214a and an outer mouth portion or second seat portion 216a for sealing with first and second seal portions of the fluid isolation adapter, as described above.

FIG. 5B illustrates another exemplary embodiment of a connector body 210b including a first fluid passage (e.g., sample fluid passage) 211b extending along a central axis X of the connector body from an adapter port 212b to a valve cavity or valve port 219b, and from the valve port to a first connector port 217b (e.g., a female threaded connector, as shown), and a second fluid passage (e.g., vent gas or conditioning passage) 213b extending laterally from the adapter port 212b to a second connector port 218b (e.g., a female threaded connector, as shown). The valve port 219b is configured for installation of a rotationally actuated valve arrangement (e.g., ball or plug-type shutoff valve), for example, to selectively block the flow of sample fluid until a sample is ready to be taken. Similar to the embodiment of FIG. 2, the connector body 210b includes a tapered annular first seat portion 214b and an outer mouth portion or second seat portion 216a for sealing with first and second seal portions of the fluid isolation adapter, as described above.

FIG. 5C illustrates another exemplary embodiment of a connector body 210c including a first fluid passage (e.g., sample fluid passage) 211c extending along a central axis X of the connector body from an adapter port 212c to a valve cavity or valve port 219c, and from the valve port to a first connector port 217c (e.g., a female threaded connector, as shown), and a second fluid passage (e.g., vent gas or conditioning passage) 213c extending laterally from the adapter port 212c to a second connector port 218c (e.g., a female threaded connector, as shown). The valve port 219c is configured for installation of an axially actuated valve arrangement (e.g., diaphragm, needle, or bellows-type shutoff valve), for example, to block the flow of sample fluid until a sample is ready to be taken. Similar to the embodiment of FIG. 2, the connector body 210c includes a tapered annular first seat portion 214c and an outer mouth portion or second seat portion 216c for sealing with first and second seal portions of the fluid isolation adapter, as described above.

FIG. 5D illustrates another exemplary embodiment of a connector body 210d including a first fluid passage (e.g., sample fluid passage) 211d extending along a central axis X of the connector body from an adapter port 212d to a valve cavity or valve port 219d, and from the valve port to a passthrough port 217d, and a second fluid passage (e.g., vent gas or conditioning passage) 213d extending laterally from the adapter port 212d to a second connector port 218d (e.g., a female threaded connector, as shown). The valve port 219d is configured for installation of a diaphragm, needle, or bellows-type shutoff valve, for example, to block the flow of sample fluid until a sample is ready to be taken. The passthrough port 217d may include end connections (not shown) for installing the connector body in a fluid line, to permit sampling of fluid as it passes through the fluid line. Similar to the embodiment of FIG. 2, the connector body 210d includes a tapered annular first seat portion 214d and an outer mouth portion or second seat portion 216d for sealing with first and second seal portions of the fluid isolation adapter, as described above.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A multiple port connecting assembly comprising:
   a connector body including a first fluid passage extending from an adapter port to a first connector port, a second fluid passage extending from the adapter port to a second connector port and a seat portion disposed between the first fluid passage and the second fluid passage; and
   a fluid isolation adapter removably assembled with the adapter port, the fluid isolation adapter including an adapter body defining a first end passage that connects with the first fluid passage at a first connection in the adapter port, a second end passage that connects with the second fluid passage at a second connection in the adapter port, a first seal portion sealing against the seat portion to isolate the first connection from the second connection, and a second seal portion sealing against a tapered outer mouth portion of the adapter port to seal against external leakage;
   wherein the second seal portion comprises a cylindrical outer surface of the adapter body, the assembly further comprising a ferrule arrangement clamped into gripping and sealing engagement between the cylindrical outer surface and the tapered outer mouth portion.

2. The assembly of claim 1, wherein the connector body and the adapter body together define an annular cavity within the adapter port, between the first and second seal portions, with the annular cavity providing the second connection between the second fluid passage and the second end passage.

3. The assembly of claim 1, further comprising a threaded fitting nut assembled with a threaded fitting connector on the connector body to secure the fluid isolation adapter in sealing engagement within the adapter port.

4. The assembly of claim 1, wherein the first seal portion comprises a conical nose portion of the adapter body and the seat portion comprises a tapered annular seat portion.

5. The assembly of claim 1, further comprising a first tube extending from a distal end of the first end passage and a second tube extending from a distal end of the second end passage.

6. The assembly of claim 5, wherein the second tube is radially offset from the first tube.

7. The assembly of claim 5, wherein the second tube terminates at an end aperture proximal to an end aperture of the first tube.

8. The assembly of claim 1, wherein the second seal portion seals against the tapered outer mouth portion with a metal-to-metal seal.

9. A multiple port connecting assembly comprising:
   a connector body including a first fluid passage extending from an adapter port to a first connector port, a second fluid passage extending from the adapter port to a second connector port, a first seat portion disposed between the first fluid passage and the second fluid passage, and a second seat portion disposed within the adapter port;
   a fluid isolation adapter removably assembled with the adapter port, the fluid isolation adapter including an adapter body defining a first end passage that connects with the first fluid passage at a first connection in the adapter port, a second end passage that connects with the second fluid passage at a second connection in the adapter port, a first seal portion sealing against the first seat portion to isolate the first connection from the second connection, and a second seal portion sealing against the second seat portion to seal the second connection against external leakage;

a first tube extending from a distal end of the first end passage; and a second tube extending from a distal end of the second end passage;

wherein the second tube surrounds and is concentric with the first tube.

10. The assembly of claim 9, wherein the second seal portion comprises a cylindrical outer surface of the adapter body, the assembly further comprising a ferrule arrangement clamped into gripping and sealing engagement between the cylindrical outer surface and the tapered outer mouth portion.

11. A system for collecting a liquid sample, the system comprising:

a connector body including a first fluid passage extending from an adapter port to a first connector port, a second fluid passage extending from the adapter port to a second connector port, a first seat portion disposed between the first fluid passage and the second fluid passage, and a second seat portion disposed within the adapter port;

a fluid isolation adapter removably assembled with the adapter port, the fluid isolation adapter including an adapter body defining a first end passage that connects with the first fluid passage at a first connection in the adapter port, a second end passage that connects with the second fluid passage at a second connection in the adapter port, a first seal portion sealing against the first seat portion to isolate the first connection from the second connection, and a second seal portion sealing against the second seat portion to seal the second connection against external leakage; and a sample container, wherein a first tube extending from a distal end portion of the first end passage extends into the sample container to supply sample fluid to the sample container;

wherein the second connector port comprises a vent port, and the second end passage is in fluid communication with the sample container to vent gas from the sample container to the vent port.

12. The system of claim 11, wherein the second seat portion comprises a tapered outer mouth portion of the adapter port.

13. The system of claim 11, wherein the fluid isolation adapter comprises a second tube extending from a distal end portion of the second fluid passage and into the sample container.

\* \* \* \* \*